(12) United States Patent
Laarakkers et al.

(10) Patent No.: US 9,603,022 B2
(45) Date of Patent: Mar. 21, 2017

(54) MANAGING UNDESIRED SERVICE REQUESTS IN A NETWORK

(75) Inventors: Jeroen Laarakkers, Nootdorp (NL); Frank Muller, Delft (NL); Tim Hartog, The Hague (NL)

(73) Assignees: Koninklijke KPN N.V., The Hague (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 13/266,399

(22) PCT Filed: Apr. 23, 2010

(86) PCT No.: PCT/EP2010/055416
§ 371 (c)(1),
(2), (4) Date: Oct. 26, 2011

(87) PCT Pub. No.: WO2010/124996
PCT Pub. Date: Nov. 4, 2010

(65) Prior Publication Data
US 2012/0047262 A1    Feb. 23, 2012

(30) Foreign Application Priority Data

Apr. 27, 2009  (EP) ..................................... 09005814

(51) Int. Cl.
*H04W 12/12* (2009.01)
*H04L 29/06* (2006.01)
(Continued)

(52) U.S. Cl.
CPC ........... *H04W 12/12* (2013.01); *H04L 63/145* (2013.01); *H04L 63/101* (2013.01); *H04W 4/00* (2013.01); *H04W 12/06* (2013.01); *H04W 88/10* (2013.01)

(58) Field of Classification Search
None
See application file for complete search history.

(56) References Cited

U.S. PATENT DOCUMENTS 7,131,003 B2 * 10/2006 Lord et al. .................... 713/168
7,321,969 B2 *  1/2008 Schoen et al. ................ 713/153
(Continued)

FOREIGN PATENT DOCUMENTS

JP    2006106928    10/2006
JP    2007-166156    6/2007
(Continued)

OTHER PUBLICATIONS

Mohammad Abdul Mannan, "Secure Public Instant Messaging", Aug. 2005, All.*

(Continued)

*Primary Examiner* — Ninos Donabed
(74) *Attorney, Agent, or Firm* — McDonnell Boehnen Hulbert & Berghoff LLP

(57) ABSTRACT

A Method and a system for managing undesired service requests sent from at least one terminal to a network are described, wherein the network comprises a network node for storing trusted service-information. The method comprises the steps of: the network receiving a service request from a terminal, the request comprising service request information; and, sending, preferably via a secure communication channel, a user verification request for requesting the user to verify the service requested by the terminal if at least part of the service request information is not listed in the trusted service-information.

19 Claims, 3 Drawing Sheets

(51) Int. Cl.
*H04W 4/00* (2009.01)
*H04W 88/10* (2009.01)
*H04W 12/06* (2009.01)

(56) References Cited

U.S. PATENT DOCUMENTS

| | | | | |
|---|---|---|---|---|
| 7,529,371 | B2* | 5/2009 | Chen | H04L 63/0838 380/247 |
| 7,558,955 | B2* | 7/2009 | Hooker et al. | 713/168 |
| 7,650,500 | B2* | 1/2010 | Matoba | H04L 63/0272 713/163 |
| 7,706,838 | B2* | 4/2010 | Atsmon | G06F 21/34 235/375 |
| 7,739,508 | B2* | 6/2010 | Lord et al. | 713/175 |
| 7,801,510 | B2* | 9/2010 | Jung | H04L 63/08 455/410 |
| 8,117,273 | B1* | 2/2012 | Mathur et al. | 709/207 |
| 8,996,485 | B1* | 3/2015 | Krishnamurthy | G06F 21/30 707/705 |
| 2003/0204569 | A1* | 10/2003 | Andrews et al. | 709/206 |
| 2003/0204720 | A1* | 10/2003 | Schoen et al. | 713/153 |
| 2004/0168055 | A1* | 8/2004 | Lord et al. | 713/156 |
| 2004/0210772 | A1* | 10/2004 | Hooker et al. | 713/201 |
| 2005/0060399 | A1 | 3/2005 | Murakami et al. | |
| 2007/0050624 | A1* | 3/2007 | Lord et al. | 713/168 |
| 2007/0073823 | A1* | 3/2007 | Cohen et al. | 709/207 |
| 2007/0245422 | A1 | 10/2007 | Hwang et al. | |
| 2008/0098225 | A1* | 4/2008 | Baysinger | H04L 63/083 713/171 |
| 2008/0196099 | A1* | 8/2008 | Shastri | 726/12 |
| 2010/0056099 | A1* | 3/2010 | Kazmi | 455/404.1 |
| 2010/0131409 | A1* | 5/2010 | Lawyer et al. | 705/44 |
| 2010/0131589 | A1* | 5/2010 | Lawyer et al. | 709/203 |
| 2010/0223471 | A1* | 9/2010 | Fresko et al. | 713/176 |
| 2013/0007875 | A1* | 1/2013 | Jakobsson et al. | 726/19 |

FOREIGN PATENT DOCUMENTS

| | | | |
|---|---|---|---|
| JP | 2007310781 | 11/2007 | |
| JP | 2008011148 | 1/2008 | |
| JP | 2009512296 | 3/2009 | |
| WO | WO2007/041157 | 4/2007 | |
| WO | WO2007042512 A2 | 4/2007 | |
| WO | 2008/001061 A1 | 1/2008 | |
| WO | WO2008/051933 | 5/2008 | |
| WO | WO 2009041804 A2 * | 4/2009 | H04L 9/32 |

OTHER PUBLICATIONS

PCT International Search Report and Written Opinion, PCT International Application No. PCT/EP2010/055416 dated Jun. 9, 2010.
European Search Report, European Patent Application No. 09005814.0 dated Oct. 22, 2009.
Arkko, J., et al., "Extensible Authentication Protocol Method for 3rd Generation Authentication and Key Agreement (EAP-AKA)", Network Working Group, Request for Comments 4187, Jan. 2006, pp. 1-80.

* cited by examiner

MANAGING UNDESIRED SERVICE REQUESTS IN A NETWORK

RELATED APPLICATIONS

This application claims the benefits of EP Application No. 09005814.0, filed on Apr. 27, 2009, and of PCT Application PCT/EP 2010/055416, filed Apr. 23, 2010, which are herein incorporated by reference in their entirety.

FIELD OF THE INVENTION

The invention relates to managing undesired service requests in a network and, in particular, though not exclusively, to a method and a system for managing undesired service requests in a network, a user verification function and a terminal for use in such system and a computer program product for executing the method.

BACKGROUND OF THE INVENTION

The new generation mobile devices, such as smart phones, provide enhanced computational functionalities via open network connections. Such mobile devices are e.g. capable of receiving e-mail, sharing software with one another through short-range connections, downloading and executing software from the Internet, making automated calls and acting under remote control. Hence, similar to a personal computer, mobile devices and in particular the software components involved in the setting up of a connection between the mobile device to the network, are vulnerable to attacks of malicious code (malware). Typically malware attempts to make misuse of a mobile device or to simply disrupt legitimate use of a mobile device. A chip card that is possibly present on the mobile device, e.g. a (U)SIM, does not provide protection against this vulnerability.

One type of malware is referred to as dialers. Dialers are pieces of malicious code capable of illegally setting up calls on the infected mobile device. Such dialers often use authentication information from the (U)SIM of the mobile device to obtain access to the network as if the connection is legitimately set up by the mobile user. After the authentication procedure, the dialer starts to set up calls to e.g. expensive premium numbers—often not detectable for the user of the infected mobile device—leading to substantial financial risks for both the mobile user and the mobile operator.

Measures may be taken to eliminate or at least reduce the undesired effects of such malware. One known measure is the introduction of a filter in the network. Such filters are described in WO2007/041157 and US2005/0060399. A filter residing in a base station monitors calls transmitted from a mobile device and blocks calls which are listed on a blacklist. The network operator and/or mobile user may add service requests to the blacklist which should be explicitly excluded by the filter.

One problem relating to the use of such a filter is the management of the list of excluded service requests. On the operator side there are three problems. The first is that to block all undesired service requests, the size of the necessary blacklist can become very large and nearly unmanageable. The second problem is that a constant search for malicious services is necessary to keep the blacklist up-to date. The third problem is that the identification of suspicious requests requires analyses of the service requests of each individual mobile device user. Such analyses thus require substantial resources in the network. On the mobile user side, one problem resides in the fact that unwanted service requests of the mobile device are usually unnoticed by the user and only detected after billing, i.e. after the damage has already been realized. Another problem for the user may arise from the operator blacklisting services that the user does want to use.

US2008/0196099 discloses a method of filtering URLs (Uniform Resource Locators) inside IM (Instant Messaging) applications. In case an IM message contains a URL, this URL is checked against a blacklist of known malicious URLs. When the URL is not on the blacklist the sender is presented a challenge to confirm that the sender is an actual user and not a program (malware). This method protects recipients from receiving IM messages with malicious URLs. Furthermore the system can be configured to maintain an "allow list" or "white list" of known non-malicious URLs. This way an IM message containing a URL from the "white list" can be forwarded to the recipient without challenging the sender.

This method is undesirable from both the security point of view and the customer point of view when it is applied in the mobile phone context. From a security perspective the method of US2008/0196099 offers no solution for the problem at hand since not the content of communication forms a threat but the destination of the communication, e.g. premium numbers for calls or text messages (SMS). Therefore the described method tries to protect the recipient and not the sender. This method also forms a nuisance for the sender since the sender will be challenged for every IM message containing a URL which is not in the blacklist (or whitelist). When the sender (successfully) replies to the challenge the IM message including the URL will be forwarded but the whitelist is not updated based on the sender's action. This means that the sender will be presented a challenge for the same URL over and over again.

Summarizing the problems in the prior art:
the size of the blacklist may become unmanageable because all suspicious services must be put in the blacklist;
there is not an automatic build-up of whitelists;
the malware detection does not include a test on the particular service;
there is no rejection of service requests to new malicious destinations therefore a constant effort for the network operator or user to keep the blacklist up-to-date is needed;
the user is bothered multiple times when carrying out identical service requests;
there is the possibility that a network operator blacklists services that a user does want to use.

Hence, there is a need in the art for a simple method of managing undesired service requests effectively and preventing misuse.

SUMMARY OF THE INVENTION

It is an object of the invention to reduce or eliminate at least one of the drawbacks known in the prior art and to provide in a first aspect of the invention a method and system for managing undesired service requests sent from at least one terminal (mobile communications device) to a network, wherein the network may comprise a network node for storing trusted service-information. The method may comprise at least one of the steps of: the network receiving a service request from a terminal, the request comprising service request information; and/or sending, preferably via a secure communication channel, a user verification request for requesting the user to verify the service requested by the terminal if at least part of the service request information is not listed in the trusted service-information. Trusted service-information contains about at least one of the type of the service (SMS, MMS, call, instant messaging, video etc) and the destination (e.g. the address, the telephone number) of the service which is requested, whether the type or destination both are allowed or not allowed. In an embodiment of the invention the listed trusted service-information is filled by the subsequent requests, potentially complemented by an independent filling of the trusted service-information. In another embodiment of the invention the list with the trusted service-information is filled by an independent filling of the trusted service-information. The user can be a user effectively using the terminal or a user owing the terminal or been entitled or designated to execute the verification of the service request.

The method and system efficiently prevent damage caused by malware by verifying with the user if the placed service request is a legitimate request. This effect is achieved by dynamically maintaining a trusted service-information (e.g. in the form of a white list) of allowed services in the network and verifying for each service request that the service is included in the trusted service-information before allowing the service. When the service is not included, the network shall dynamically request the user, in a secure manner, to verify if the request should be established. Through this method, requests originating from malware may be recognized by the user and the user may reject the setup of such services.

In one embodiment, the method further comprises at least one of the steps of: receiving, preferably via a secure communication channel, a user verification response, the response comprising verification information provided by the user, the verification information indicating whether the user accepts or rejects the service request; and/or adding at least part of the service request information to the trusted service-information if the verification information provides an indication that the requested service is allowed. The network thus automatically sets up a dialog with the user for service verification. If the service is allowed by the user, the trusted service-information is dynamically updated.

In another embodiment the method may further comprise at least one of the steps of: establishing an encrypted communication channel, preferably using a secure key stored in an identity module of the terminal, between said terminal and said network; sending the user verification request via said encrypted communication channel to the terminal; and/or receiving via the encrypted communication channel a user verification response, the response comprising verification information provided by the user whether the user accepts or rejects the service request. The user dialog may be established using an encrypted communications channel using the private key in stored in the identity module of the terminal.

In yet a further embodiment, the terminal may comprise at least one of the following elements: an identity module, one or more input/output interfaces and/or at least a trusted hardware component. Said trusted hardware component may be configured for establishing one or more trusted communication paths between said trusted hardware component and the identity module and/or the one or more input/output interfaces. Using one or more trusted hardware components in the terminal, one or more trusted communications paths in the terminal may be achieved, thereby preventing malware from interfering with the user verification dialog between the user and the network.

In one variant, the method may further comprise the at least one of the steps of: establishing a further communication channel which is different from the communication channel through which the service request is received by the network; sending the user verification request via the secure channel to the terminal; and/or receiving via the further communication channel a user verification response, the response comprising verification information whether the subscriber allows or rejects the service request. In yet another variant, the further communication channel may be provided by a messaging service, preferably a short message service or an USSD service.

In a further variant, the verification request may comprise a test configured for determining whether the user is human or not, preferably a reverse Turing test; more preferably a Captcha, and wherein the verification response comprises information whether the test was successful or not.

In yet a further variant the network may comprise at least one service provisioning network node. Said service provisioning network node may comprising a visiting location register (VLR) comprising trusted service-information. Said network node may further comprise an user verification function for sending in response to a service request from a terminal a user verification request to the terminal at least part of the service request information is not listed in the trusted service-information. In one variant the network may comprise a home location register (HLR), wherein said home location register comprises trusted service-information of said terminal. The method may further comprise the step of transmitting trusted service-information from said home location register to said visiting location register. Upon registration of a terminal to the network the VLR of service provisioning network node serving the terminal may retrieve the trusted service-information from the home locating register HLR of the home network of the terminal. Similarly, the trusted service-information at the HLR may be updated by transmitting trusted services verified by the user and added to the trusted service-information in the VLR back to the HLR.

In another aspect the invention may relate to a system for managing undesired service requests sent from at least one terminal to a network. The system may comprises at least one of the following features: one or more terminals for establishing a communication channel with the network; a service provisioning network node configured for receiving a service request comprising service request information from at least one of said terminals; and/or a trusted services database connected to said service provisioning network node; wherein said service provisioning network node being configured for sending, preferably via a secure communication channel, a user verification request for requesting the user to verify the service requested by the terminal if at least part of the service request information is not listed in the trusted service-information.

In a further aspect the invention may relate to a user verification function for use in a system as described above, wherein the user verification function may comprise at least one of the features: means for receiving a service request from a terminal, said service request comprising service request information; means for checking whether at least part of said service request information is comprised a trusted service database; and/or means for establishing a secure dialog between the user of the terminal and the network if at least part of the service request information is not listed in the trusted service-information.

In yet a further aspect the invention may relate to a terminal for use in a system as described above. The terminal may comprise at least one of the following features: a user verification client for establishing in response to a user verification request from the service provisioning network node a secure dialog between the user of the terminal and the network; an identity module for providing a private key for establishing a secure communications channel for said dialog; an input element for receiving dialog information from the user; an output element for transmitting dialog information to the user; and/or a trusted hardware component for establishing, preferably using a trusted computing standard, one or more trusted communications paths between said user verification client, identity module, input element and/or output element.

The invention may also relate to a computer program product comprising software code portions configured for, when run in the memory of a computer, preferably a computer located in one or more network nodes, executing the method steps according to any of the method claims as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
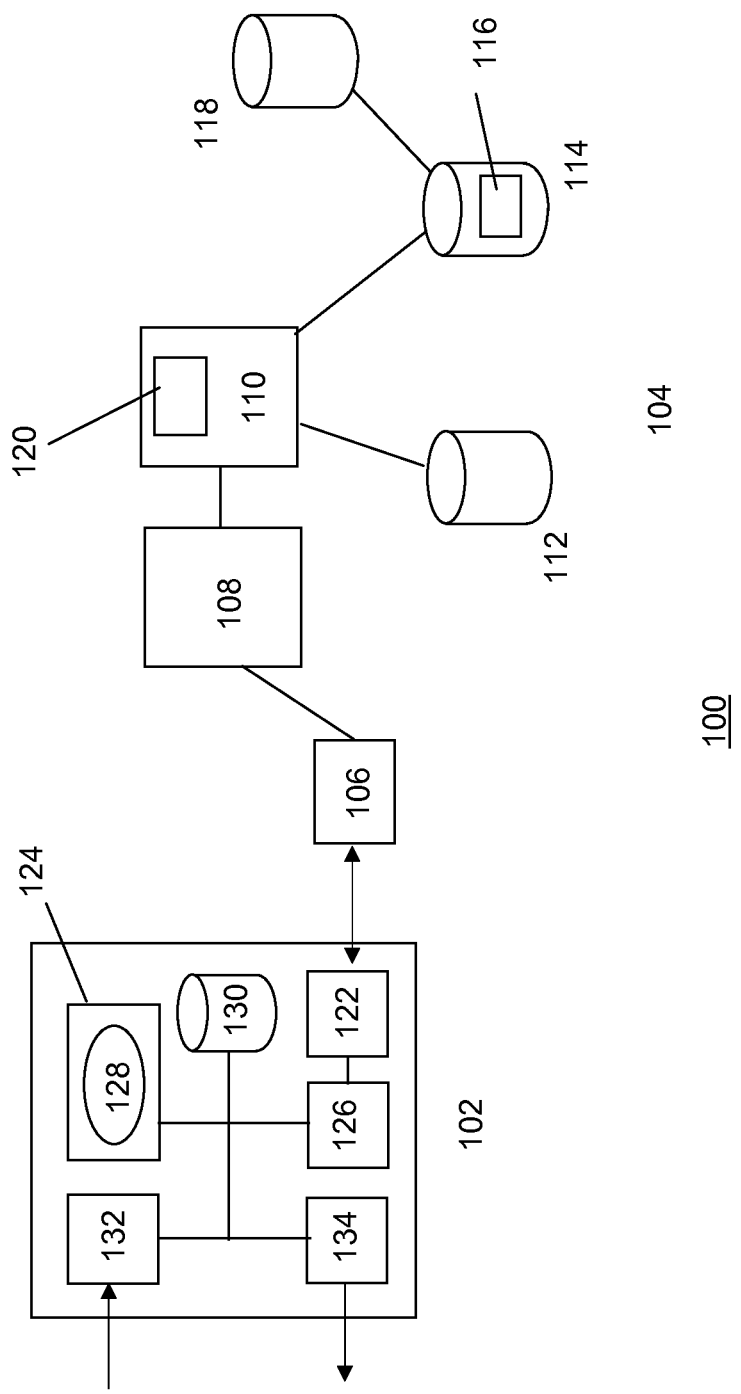
FIG. 1 depicts a schematic representation of a communications system according to one embodiment of the invention.

FIG. 1 illustrates a schematic representation of a communications system 100 according to one embodiment of the invention. The system may comprise a terminal 102 connected to a communications network 104. In one embodiment the network may be a 2G-type (e.g. GSM) mobile network comprising a base transceiver station (BTS) 106 serving as an access node. The BTS may be connected via a base station controller (BSC) 108 to a mobile switching center (MSC) 110 of e.g. a visiting network (VN). Further, the MSC may be linked to a visited location register (VLR) 112, which is a database that stores user related data and performs security functions. The MSC may be further linked to the home location register (HRL) 114 which comprises authentication centre (AuC) 116. The HLR/AUC may be located in the home network (HN) where the user of the terminal 102 has a subscription with the network operator. The HLR stores user related data, e.g. subscription related data, and co-operates with the MSC/VLR 110 to keep track of the location of the terminal. The authentication centre (AuC) comprises (amongst others) algorithms for the calculation of authentication parameters used in the authentication procedure. For each subscriber the AuC stores a secret authentication key K which is also stored in an associated identity module, e.g. a (U)SIM card or the like, located in terminal.

A Trusted Services (TS) database 118 comprising trusted service-information, e.g. one or more trusted lists of allowable and/or not allowable service identifiers (e.g. telephone numbers) associated with a subscriber may be connected to or may be part of the HLR. The list in the TS database may be updated by the HLR of the subscriber and/or by the service verification function 120. The service verification function is configured to access the TS database and to set up in response to a service request from the terminal a secure communication channel with the user terminal.

The service verification function may be implemented in the form of a functional hardware component or as a computer program product executed on the MSC or another separate network element connected to the MSC. Alternatively, the function may be a distributed function involving two or more network elements comprising one or more software program products, which when executed provide the call verification functionality. A more detailed explanation of the call verification function will be given hereunder in relation with FIG. 2.

Other networks than a GSM network as depicted in FIG. 1 may be used. For example, in one embodiment the network may be a 3G-type (UMTS) mobile network comprising 3G network elements. In that case, the network may comprise a radio base station (RBS) 106 connected via a Radio Network Controller (RNC) 108 to a Serving GPRS Support Node (SGSN) 110. The SGSN is further connected to a VLR 112 and an AuC/HLR 114,116 in a similar way as in the 2G-type network as described above. In a further embodiment the communications network 104 may comprise IMS-based network elements in the form of a set of Call/Session Control Functions (CSCF) such as a Proxy-CSCF (P-CSCF), an Interrogating-CSCF (I-CSCF), a Serving-CSCF (S-CSCF) and a Home Subscriber Server (HSS). Further variants include 3GPP LTE or 3GPP SAE network elements.

The terminal 102 may be a personal computer or a mobile device such as a smart phone, a personal digital assistant (PDA), a laptop, or any other mobile communications device capable of providing services over one or more mobile networks (2G, 2.5G, 3G, 4G, NG, WiMax, etc.) The terminal comprises a radio module 122, an operating system (OS) 124 and an identity module 120.

The radio module 122 acts as connection point to wireless network services and comprises for that purpose at least an air-interface comprising an RF receiver connect to one more antenna's. FIG. 1 depicts an exemplary implementation wherein the radio card 122 provides radio contact with the base station 106. The RF interface of the radio module is capable of receiving and/or transmitting RF signals in accordance with various wireless technologies (e.g. TDMA for GSM services, W-CDMA for UMTS services, IEEE 802.11 used for WiFi services, Bluetooth, DECT, etc.).

The Operating System (OS) 124 of the terminal may comprise a kernel which manages the resources of the mobile device e.g. the Central Processing Unit (CPU), memory for storing program instructions 130 and data and Input/Output (I/O) devices such as the radio module 122, a display 134 and a keypad 132. Further, the OS typically comprises one or more Application Programming Interfaces (APIs) through which application programs 128 may access services offered by the OS, e.g. a radio network API for setting up a radio connection with a mobile network.

The identity module 126, which is typically removable, may be a UICC (Universal Integrated Circuit Card) for use in mobile devices suitable for 2G-type network services (GSM) or 3G-type network services, (UMTS). To that end, the UICC may comprise a Subscriber Identity Module (SIM) comprising SIM applications and/or a UMTS Subscriber Identity Module (USIM) comprising USIM applications. It is to be understood that the identity module is not limited to SIM and/or USIM applications. In further embodiments, the identity module may be an IP Multimedia Sub-system SIM (ISIM) for authenticating and accessing IMS-based services according to a predetermined IMS-based AKA as e.g. described in ETSI technical specification TS 33.203 or an extensible authentication protocol (EAP) based SIM for authenticated and accessing a network according to a predetermined EAP-based AKA as described for instance in RFC4187.

The identity module may comprise a processor, one or more memory components e.g. ROM, RAM and/or EEPROM and I/O circuitry. For authentication purposes the UICC comprises a secret service-subscriber authentication key K and one or more algorithms for calculating a response comprising one or more authentication parameters upon the reception of a random challenge.

In order to access the network, the terminal first performs an authentication procedure as defined by one of the authentication and key agreements (AKA) of the telecommunications standard used by the network. The GSM AKA is a challenge-response type authentication procedure involving sending a random number RAND to the SIM in the terminal. The SIM generates a response RES which is sent back to the network, which compares the response with an expected response calculated by the network. As part of the GSM AKA a symmetric cipher key CK is established between the mobile terminal and the serving network for ciphering data over the GSM air-interface. The GSM AKA is described in detail in ETSI standards GSM 02.09 and GSM 03.20, which is hereby incorporated by reference.

In the standard UMTS authentication procedure similar steps as in the GSM AKA are performed. However, in order to improve the security the network also authenticates itself to the terminal. In the UMTS scheme the AuC/HLR generates a random number RAND and determines an authentication vector (AV) {AUTN, RAND, XRES, CK, IK}. The SGSN/VLR subsequently forwards the RAND and AUTN to the terminal. The USIM in the terminal determines on the basis of RAND and AUTN a response RES, which is subsequently sent to the network and compared with an expected response determined by the network. Similar to the GSM AKA, a cipher key CK and an integrity key IK are established during the UMTS AKA which are used for ciphering and integrity protection of data sent over the air-interface between mobile terminal and the serving network. The UMTS AKA is described in detail in the ETSI technical specification TS 33.102, which is hereby incorporated by reference.

Figure 2:
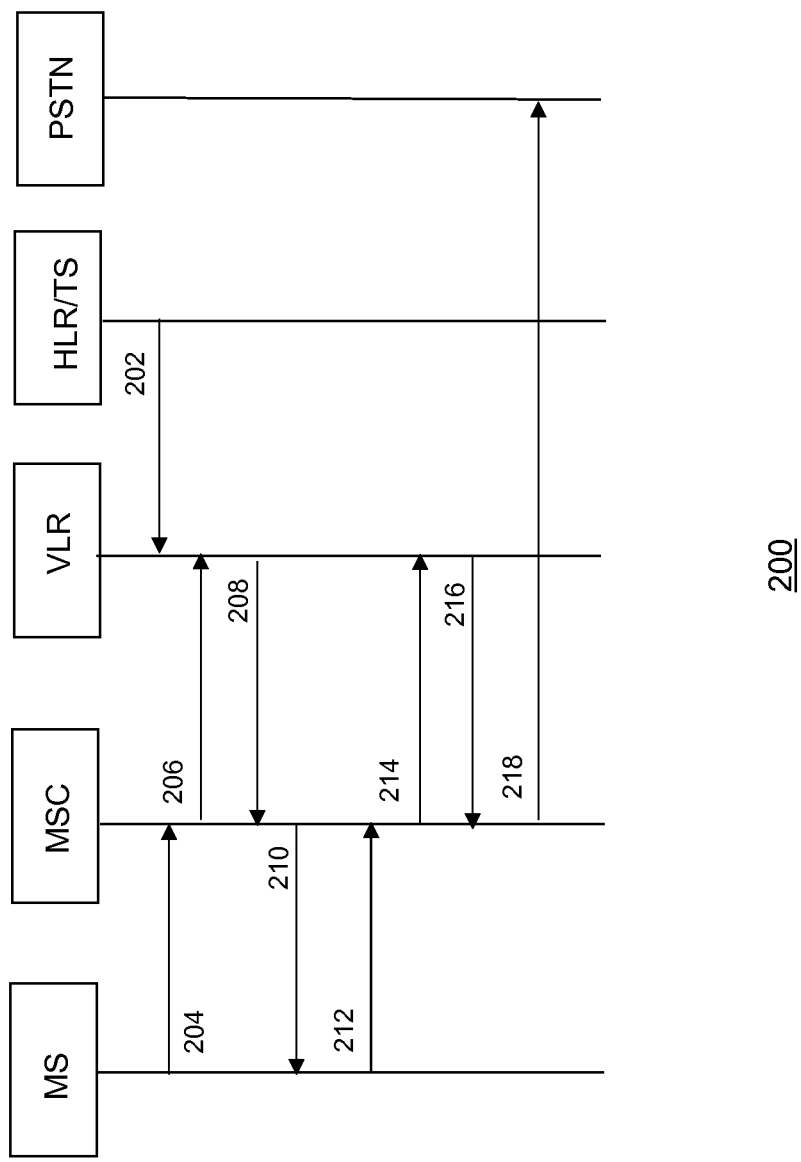
FIG. 2 depicts a flow diagram of a method according to one embodiment of the invention.

FIG. 2 illustrates a flow diagram of the setup of an originating call in a GSM network according to one embodiment of the invention. During the authentication process as described above, subscriber registration data including the subscribers identity (IMSI), authentication data, the subscriber's phone number, a list of allowable services, the HLR address of the subscriber and trusted service-information comprising amongst others a whitelist and/or blacklist, may be transferred from the HLR to the MSC/VLR (step 202). After successful authentication, the terminal may access a network service by sending a service request, e.g. a request to set-up a call comprising the Mobile Subscriber Integrated Services Digital Network Number (MSISDN) via the BSS to the MSC/VLR (step 204).

In response, the MSC checks with the VLR whether the terminal is allowed to access the requested service. Further, the service verification function within the MSC checks whether the information in the service request, in particular the MSISDN, is listed in the trusted service-information (e.g. in the form of a list of trusted telephone numbers). The list may be checked by accessing the VLR connected to the MSC (steps 206 and 208). If a match is found, the MSC requests the BSS to allocate resources for the call and route the call via the GMSC, a gateway that connects the mobile network with a fixed PSTN network, to the recipient (not shown).

If the number is not found in the list of allowable numbers, the MSC service verification function may initiate a dialog with the originating terminal in order to request the user of the terminal to verify whether the call is allowable or not. To this end, a secure communication channel may be established between the terminal and the network, which is difficult to compromise by the malware. Examples of such secure communication channels will be described below in more detail.

Using a secure communication channel, the service verification function in the MSC/VLR may send a user verification request to the user terminal. The user verification request may trigger a dialog with the user of the terminal in which the user is asked to verify whether or not to establish the requested service (step 210). In response to the user verification request, a user response message is sent back to service verification function in the MSC (step 212). If the user response provides information that the call is accepted by the user, the trusted service list is updated by adding the number to the trusted service-information in the TS database (steps 214 and 216). After the call verification dialog with the user, the MSC allocates resources for the requested service, e.g. a call, and routes the service request via the GMSC and one or more communications networks, e.g. the public switched telephone network (PSTN) to the dialed terminal (step 218). If the response message indicates that the user does not accept the call, the call is rejected by the MSC (not shown).

Hence, contrary the conventional setup of an originating call, the invention allows strict control over service sent by the terminal to the network by checking whether information on the service request is listed in a white list. Using the white list, malware generated originating service requests may be efficiently blocked. Further, the invention allows the white list to be constructed in an interactive and dynamic way. Once the list has a certain size, the use of the white list as generated by the call verification feature results in increased certainty for the network operators that the registered calls are in fact undisputed call.

The communication channel between the terminal and the network should be secure in the sense that it does not allow malware to interfere. In one embodiment, the secure communication channel may be an encrypted radio channel which uses the cipher key CK as established between the mobile terminal and the serving network during the authentication procedure on the basis of the GSM or UMTS AKA. In this scheme the MSC/VLR may send an encrypted user verification request 210 to a terminal which may be modified such that malware is prevented from interfering with the dialog between the user and the network. One exemplary embodiment of such terminal 300 is depicted in more detail in FIG. 3. In this embodiment, the terminal comprises a user verification application 302 (client) running in the OS 304 of the terminal. The terminal further comprises one or more trusted hardware components 306 (THC) for establishing one or more trusted communication paths 308-316 between the user verification client 302, an identity module 318 (e.g. (U)SIM), a memory 320 and/or one or more I/O interfaces such as an input element 322 (keypad, microphone, etc.) and an output element 324 (display, speaker, etc.).

The user verification request, may trigger the execution of the user verification client, which is configured to securely communicate with the (U)SIM for encrypting and decrypting data and with the keypad and the display interfaces 322,324, of the terminal for interaction with the user.

The THC may be a tamper-resistant device configured to perform multiple security functions, including local and/or remote attestation, secure data storage and secure I/O functions. These functions may be used to establish trusted communication paths within the terminal. The THC may be implemented according to a predefined trusted computing platform standard, e.g. the trusted computing platform (TCP) as defined in the Mobile Trusted Module (MTM) Specification Version 1.0, rev. 1, 12 Jun. 2007, published by the Trusted Computer Group (TCG) or Intel's Trusted Execution Technology (TXT) hardware platform.

Figure 3:
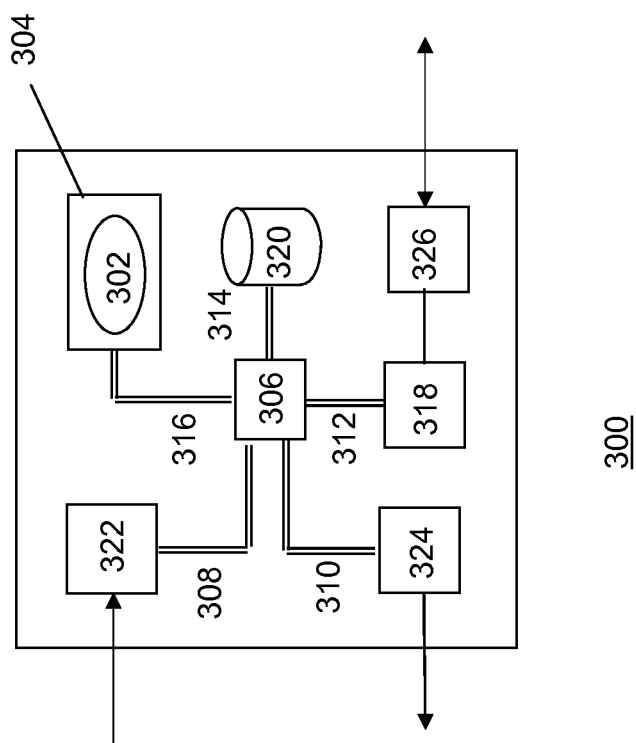
FIG. 3 depicts a terminal for use with a method according to one embodiment of the invention.

The THC may verify the integrity of the user verification client using the local and/or remote attestation function. After the integrity is approved, the THC may set-up one or more trusted communication paths within the terminal as depicted in FIG. 3. Using these trusted paths, the user verification application sets up a secure dialog with the user allowing the user to accept or reject the service request. The user response (i.e. keypad input) is sent via the radio interface 326 and the encrypted radio channel back to the service verification function in the MSC/VLR.

In another embodiment, the communication channel may be established using an additional SIM card, which is registered to the network. Such dual SIM terminal allows the service request to be sent to the network using a channel set up in accordance with the first SIM and the response of the user to a dialog box for acceptation or rejection of a service request to be sent via an encrypted communication channel using the second SIM. This embodiment relies on the fact that the malware is not aware of a second SIM card and thus provides less security when compared to the use of an encrypted communication channel in combination with a THC.

In another embodiment, the secure channel may be established as a separate communication channel on the same infrastructure. For example, in response to the reception of a service request from a terminal, the network sends a message, e.g. in the form of an SMS, EMS, MMS or USSD message, to the terminal user and the user sends the response back to the network using the same separate communication channel.

In a further variant, the service validation dialog between the terminal and the network may comprise the step of sending a test, preferably based on text, graphics and/or sound, which allows determination whether the user is human or not. The response to the test is sent to the network wherein a correct response corresponds to the acceptance of the service request by the terminal user. Preferably, the test is a reverse Turing test (e.g. a Captcha or the like). A reverse Turing test may allow the dialog to take place using a regular and possibly insecure infrastructure. However, for improved security the dialog using the reverse Turing test may be easily combined with an encrypted and/or separate communication channel as described above.

The functionality of the Trusted Services (TS) database may be enhanced by including a further list of undesired numbers (i.e. a black list). When a service request is received by the network, e.g. the MSC, it will check whether the dialed number in the request is listed in the black list or white list. If it is listed in the black list the call will be automatically rejected without any further dialog with the terminal. The black list may be updated in a similar way as described above in relation to the list of trusted services (a white list).

In one embodiment, after rejection by the user of the service request the number may be added to black list. This may be done automatically in response to the rejection by the user or, alternatively, this may be presented in the dialog box as an option to the user during the call validation dialog. Selecting the black list option will result in updating the black list in the TS database with the rejected. Such black and/or white list update may take place when communication between the MSC/VLR and the HLR takes place, e.g. the moment the HLR is informed by an MSC/VLR that a subscriber is in the area covered by the VLR, after a predetermined time period of inactivity of the subscriber, after which the terminal will be reregistered from the serving MSC/VLR. Further, such update may be real-time, i.e. directly after user verification dialog, or at the moment when the subscriber record is removed from the VLR.

Furthermore, the network operator may provide the user (indirect) access to the lists in the TS database, e.g. via a secure Internet connection, in order to allow the user to make changes to the list.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for managing a service request sent from a terminal to a network, the network comprising a network node for storing service-information, the method comprising:

receiving by the network the service request from the terminal, the request being related to one of service types SMS, MMS, call, or instant messaging and including service request information comprising at least one particular type of information for determining validity of a given request for the one of the service types;

in response to determining that the at least one particular type of information included in the received service request information is not listed in the service-information stored in the network node, the network sending a user verification request to the terminal, wherein the user verification request causes the terminal to generate a dialog on a display interface of the terminal requesting input from a user to verify if the service requested by the terminal is allowed by the user;

receiving by the network a user verification response from the terminal, the user verification response including verification information provided by the user via an input interface of the terminal, the verification information indicating whether the user accepts or rejects the service request; and in response to determining from the verification information that the requested service is allowed, updating the service-information by adding at least part of the service request information to the service-information stored in the network node.

2. The method according to claim 1, further comprising:
adding at least part of the service request information to the service-information if the verification information provides an indication that the requested service is not allowed.

3. The method according to claim 1, further comprising:
establishing an encrypted communication channel, using a private key stored in an identity module of the terminal, between the terminal and the network;
sending the user verification request to the terminal via the encrypted communication channel; and
receiving the user verification response from the terminal via the encrypted communication channel, the user verification response comprising verification information provided by the user indicating whether the user accepts or rejects the service request.

4. The method according to claim 3, wherein the terminal comprises the identity module, one or more input/output interfaces and at least one hardware component, the at least one hardware component configured to establish one or more communication paths between the hardware component and the identity module and/or the one or more input/output interfaces.

5. The method according to claim 1, further comprising:
establishing a further communication channel which is different from a communication channel through which the service request is received;
sending the user verification request to the terminal via the communication channel; and
receiving a user verification response from the terminal via the further communication channel, the response comprising verification information indicating whether the user allows or rejects the service request.

6. The method according to claim 5, wherein the communication channel is provided by a messaging service, wherein the messaging service is a short message service or an USSD service.

7. The method according to claim 1, wherein the verification request comprises a test configured to determine whether the user is human or not, wherein the test is a reverse Turing test, and wherein the verification response comprises information indicating whether the test was successful or not.

8. The method according to claim 1, wherein the network comprises a service provisioning network node, the service provisioning network node comprising a visiting location register (VLR) comprising service information, the service provisioning network node further comprises a user verification function for sending in response to the service request from the terminal the user verification request to the terminal at least part of the service request information is not listed in the service-information.

9. The method according to claim 8, wherein the network further comprises a home location register (HLR), the home location register comprising service-information of the terminal,
wherein the service-information is transmitted from the home location register to the visiting location register.

10. The method according to claim 1, wherein the stored service-information is a trusted service-information.

11. The method according to claim 1, further comprising at least one of:
sending the user verification request via a secure communication channel; and
receiving the user verification response via a secure channel.

12. The method according to claim 1 wherein a user verification request is sent via a secure channel and a user verification response is received via the same secure channel.

13. A system for managing a service request sent to a network, comprising:
at least one terminal for establishing a communication channel with the network;
a service database comprising service-information; and
a service provisioning network node connected with the service database, and comprising one or more processors and instructions stored in memory that when executed by the one or more processors cause the service provisioning network node to carry out operations including:
(i) receiving the service request, the request being related to one of service types SMS, MMS, call, or instant messaging and including service request information from the at least one terminal, the service request information comprising at least one particular type of information for determining validity of a given request for the one of the service types,
(ii) in response to determining that the at least one particular type of information included in the received service request information is not listed in the service-information in the service database, sending a user verification request to the terminal, wherein the user verification request causes the terminal to generate a dialog on a display interface of the terminal requesting input from a user to verify if the service requested by the at least one terminal is allowed by the user,
(iii) receiving a user verification response from the terminal, the user verification response including verification information provided by the user via an input interface of the terminal, the verification information indicating whether the user accepts or rejects the service request, and
(iv) in response to determining from the verification information that the requested service is allowed, updating the service-information by adding at least part of the service request information to the service-information in the service database.

14. The system according to claim 13, wherein the operations further include:
enabling a dialog between a user of or associated with the at least one terminal and the network if the at least one particular type of information included in the service request information is not listed in the service-information.

15. The system according to claim 13, wherein the at least one terminal comprises one or more processors and instructions stored in memory that when executed by the one or more processors cause the at least one terminal to carry out operations including:
in response to receiving a user verification request from the service provisioning network node, establishing a dialog between a user of the at least one terminal and the network;
providing an encryption key for establishing a communications channel for the dialog;
receiving dialog information from the user;
transmitting dialog information to the user; and
causing a hardware component to establish one or more communications paths between the operations of establishing the dialog, providing the encryption key, receiving the dialog information, and transmitting the dialog information.

16. The system according to claim 13, wherein the stored service-information is a trusted service-information.

17. A non-transitory computer-readable medium having instructions stored thereon that, when executed by one or more processors of a service provisioning network node in a network, cause the service provisioning network node to carry out operations including:
  receiving a service request from a terminal, the request having been sent by way of the network and being related to at least one of service types SMS, MMS, call, or instant messaging and including service request information comprising one particular type of information for determining validity of a given request for the one of the service types;
  in response to determining that the at least one particular type of information included in the received service request information is not listed in service-information stored in association with the service provisioning network node, sending a user verification request to the terminal, wherein the user verification request causes the terminal to generate a dialog on a display interface of the terminal requesting input from a user to verify if the service requested by the terminal is allowed by the user;
  receiving a user verification response from the terminal, the user verification response including verification information provided by the user via an input interface of the terminal, the verification information indicating whether the user accepts or rejects the service request; and
  in response to determining from the verification information that the requested service is allowed, updating the service-information by adding at least part of the service request information to the service-information.

18. A non-transitory computer-readable medium having instructions stored thereon that, when executed by one or more processors, cause the one or more processors to carry out operations including:
  receiving a service request from a terminal, the request being related to one of service types SMS, MMS, call, or instant messaging and including service request information comprising at least one particular type of information for determining validity of a given request for the one of the service types;
  in response to determining that the at least one particular type of information included in the received service request information is not listed as trusted service-information in one or more trusted lists containing one or more allowable or not allowable services, sending a user verification request to the terminal, wherein the user verification request causes the terminal to generate a dialog on a display interface of the terminal requesting input from a user to verify if the service request made by the terminal is allowed by the user;
  receiving a user verification response from the terminal, the user verification response including verification information provided by the user via an input interface of the terminal, the verification information indicating whether the user accepts or rejects the service request; and
  in response to determining from the verification information that the requested service is allowed, updating the trusted service-information by adding at least part of the service request information to the trusted service-information in the one or more trusted lists containing one or more allowable or not allowable services.

19. The non-transitory computer-readable medium according to claim 18, wherein the operations further comprise:
  establishing a further communication channel which is different from a communication channel through which the service request is received;
  sending the user verification request to the terminal via the communication channel; and
  receiving a user verification response from the terminal via the further communication channel, the response comprising verification information indicating whether the subscriber allows or rejects the service request.

* * * * *